Sept. 6, 1960  J. J. LAWSER  2,951,432
BREAD TOASTER
Filed Dec. 31, 1954  4 Sheets-Sheet 1
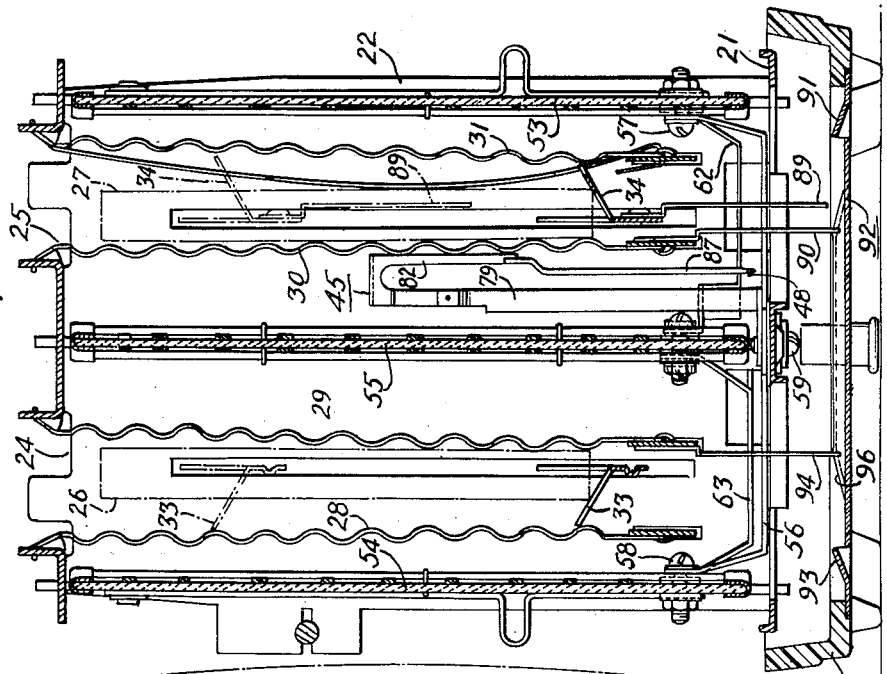
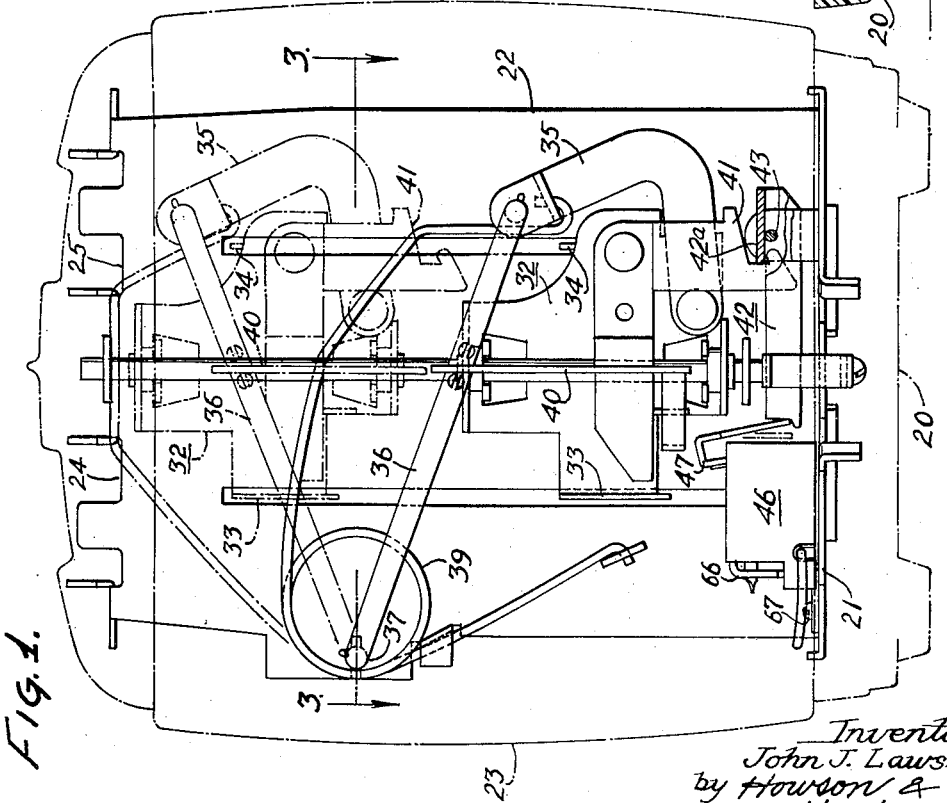
Inventor.
John J. Lawser
by Howson &
Howson
Attys.

Sept. 6, 1960      J. J. LAWSER      2,951,432

BREAD TOASTER

Filed Dec. 31, 1954      4 Sheets-Sheet 2

Inventor:
John J. Lawser
by Howson & Howson
Attys.

Sept. 6, 1960   J. J. LAWSER   2,951,432
BREAD TOASTER
Filed Dec. 31, 1954   4 Sheets-Sheet 3

Inventor:
John J. Lawser
by Howson &
Howson
Attys.

Sept. 6, 1960 J. J. LAWSER 2,951,432
BREAD TOASTER
Filed Dec. 31, 1954 4 Sheets-Sheet 4

Inventor:
John J. Lawser
by Howson &
Howson
Attys.

United States Patent Office 2,951,432
Patented Sept. 6, 1960

2,951,432
BREAD TOASTER

John J. Lawser, Abington, Pa., assignor to Proctor Electric Company, Philadelphia, Pa., a corporation of Pennsylvania Filed Dec. 31, 1954, Ser. No. 479,004
4 Claims. (Cl. 99—334)

This invention relates to automatic bread toasters and, more particularly, to electric bread toasters of the type employing a bread-sensitive thermostat to control the length of the toasting cycle. Since the early days of automatic electric bread toasters, bread-sensitive thermostats have been proposed and used to control the length of the toasting cycle. In applying these thermostats to toasters, various carriage-operating systems have been proposed. In the early proposed use of bread-sensitive thermostats, electromagnets were proposed as means to release the bread carriage to eject the bread from the bread-toasting wells. These systems were discarded because of the impracticability of electromagnets at that time. Some of the objections and problems encountered were the presence of hum in the electromagnet, the deleterious effects of high temperatures upon the electromagnet, and the deleterious effects of crumbs and other by-products of the toasting operation upon the thermostat and the electromagnet release mechanism.

It is a prime object of the invention to provide a toaster, employing a bread-sensitive thermostat and a release electromagnet, that obviates the problems that have beset prior toasters of this type.

A further object of this invention is to provide improvements in bread-sensitive thermostat construction.

Another object of the invention is to provide a novel electromagnet construction especially adapted for toaster application.

Another object of the invention is to provide novel means for cooling the thermostat to prevent spurious release of the bread carriage at the beginning of a toasting cycle.

Still another object of the invention is to provide a wiring and bus system associated with the heating elements and the control circuit having a minimum of parts.

Other objects and features of the invention will be apparent from the description to follow.

In the accompanying drawings:

Fig. 1 is an end view of a toaster structure embodying the invention, with the outer casing and base shown in dot-and-dash outline;

Fig. 2 is a cross-sectional view taken centrally through the toaster structure;

Figure 3:
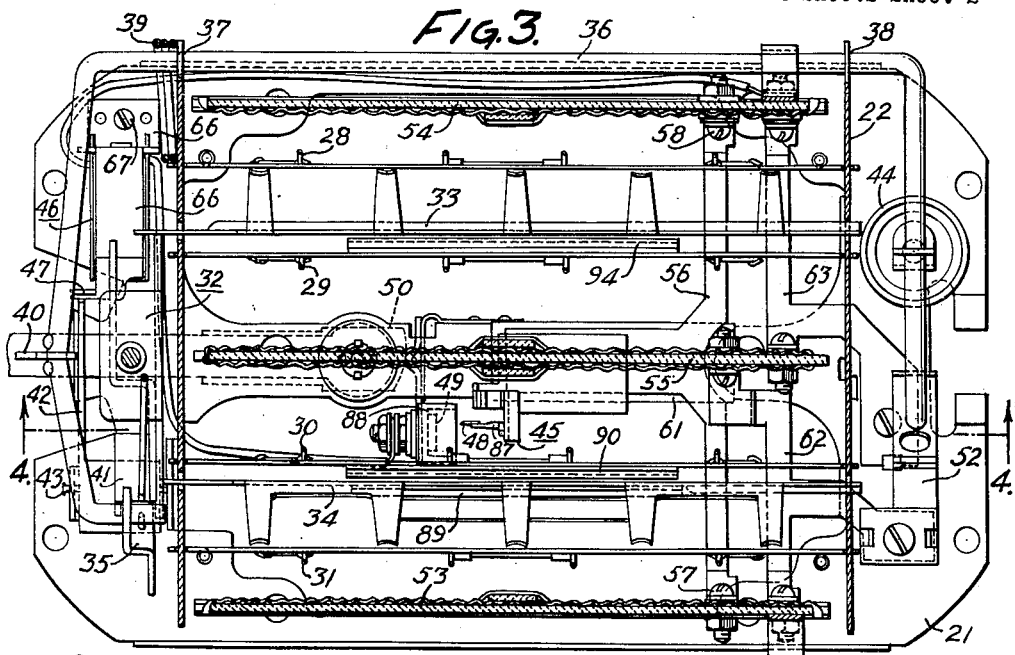
Fig. 3 is a sectional view taken along line 3—3 of Fig. 1.

Certain features of the toaster disclosed herein are disclosed and claimed in a copending application of H. F. Hild et al., Serial No. 480,118, filed January 6, 1955, and in my copending application, Serial No. 479,003, filed December 31, 1954, now Patent No. 2,796,492, issued June 18, 1957. For the present purpose, a general description of the toaster structure will suffice.

Referring first to Figs. 1 to 5, there is illustrated a two-well toaster having a base 20 formed of insulating material, a support chassis 21 supported by the base, a frame 22 supported by the chassis, and an outer shell 23 supported by the base and serving to enclose the internal structure. The frame provides two bread wells 24 and 25 within which bread slices 26 and 27 may be inserted. Grille wires 28, 29 and 30, 31, supported by the frame 22, serve to define the two bread wells. A bread carriage 32, having bread-supporting racks 33 and 34 within the two bread wells, serves to support the bread slices. The carriage is connected through link 35 to a lever 36 pivoted at 37 and 38 to the frame 22. The carriage is urged upwardly by a spring 39, and it is moved downwardly to lower the bread slices to toasting position by means of a manually-operable member 40 connected to lever 36. As shown in Fig. 1, the carriage is held in the toasting position by a latch mechanism comprising a latch element 41 pivotally mounted on the carriage and including a hooked lower end which is hooked beneath ledge 42a of cooperating latch element 42 mounted on a stationary pivot 43 as the carriage reaches its lowermost position. Release of the latch mechanism at the end of the toasting operation permits the bread carriage to be moved upwardly by spring 39, thus raising the bread slices. A dashpot 44, connected to lever 36, serves to limit the speed of upward movement of the carriage.

The control of the toasting operation is performed by the bread-sensitive thermostat 45 positioned adjacent one of the bread wells, and by the electromagnet 46 which controls the latch mechanism. During the toasting operation, latch element 42 is held against upward movement about its pivot 43 by the armature 47 of the electromagnet, which is then deenergized. At the end of the toasting operation, the electromagnet is energized by closure of switch elements 48 and 49 controlled by the thermostat. Energization of the electromagnet causes movement of its armature 47 out of engagement with latch element 42, as indicated in broken lines toward the bottom of Figure 1, permitting the latter to swing upwardly under the force of spring 39, and the latch element 41 is thus freed and the bread carriage is permitted to rise.

It should be noted that latch element 42 is of substantial length and it is engageable by latch element 41 near the pivot 43 and by the armature 47 relatively remote from said pivot. By virtue of this arrangement, only a small resisting force is required to be exerted on the armature to maintain engagement of the latch elements, and only a small force is required to be exerted by the electromagnet to effect disengagement of said elements. Thus, the work load of the electromagnet is reduced and the latter may operate on low voltage and low current.

For selection of desired toast color, the toaster preferably employs an adjusting mechanism designated generally by reference numeral 50, which is disclosed and claimed in my above-mentioned application.

The toaster circuit

Figure 10:
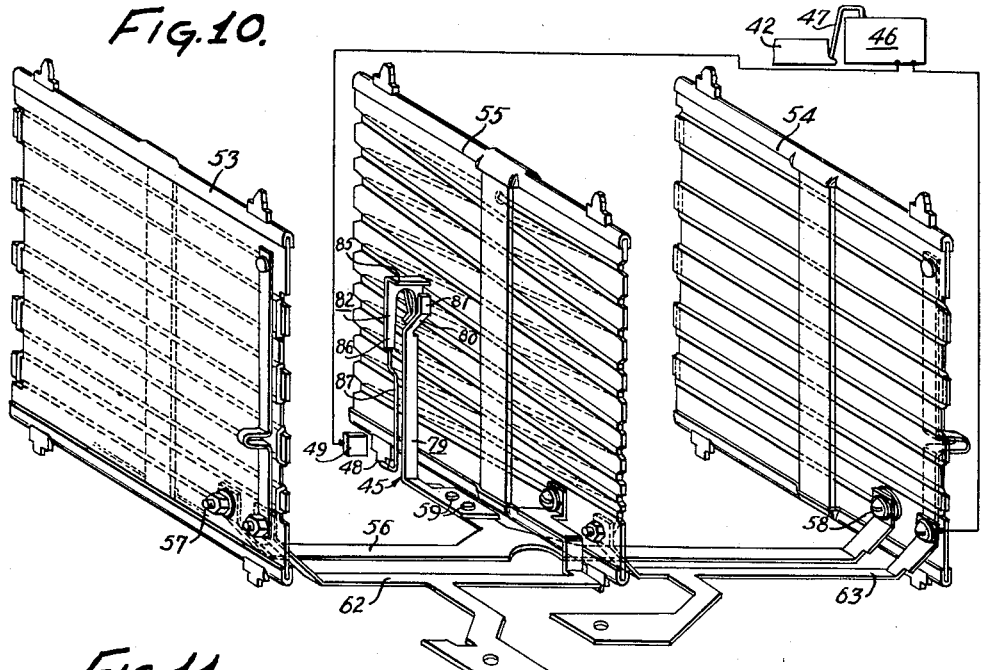
Fig. 10 is an isometric view of the heating elements and the electrical bus arrangement employed.
Figure 11:
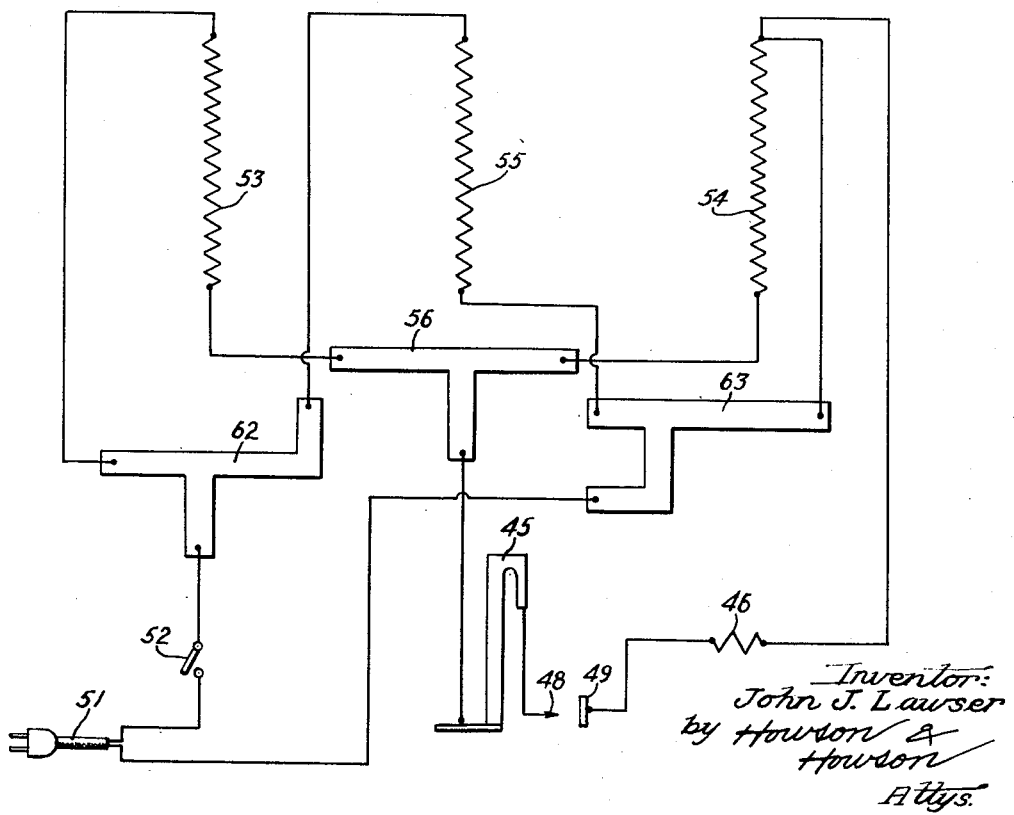
Fig. 11 is a diagrammatic illustration of the electrical circuit.

Referring now to Figs. 10 and 11, the circuit comprises a service cord 51 for connection to a supply line, a switch 52 operated by lever 36, which is closed when the carriage is in its lowered position and opened upon raising of the carriage, outer heating elements 53 and 54 and the center heating element 55. The outer heating elements 53 and 54 are serially connected across the supply line, while the center heating element 55 is connected directly across the supply line. The heating elements 53 and 54 are electrically interconnected by a bus 56 (see also Figs. 2 and 3). This bus is generally T-shaped and is made of aluminum or similar material. Its arms are connected, as by screws 57 and 58 to heating elements 53 and 54, respectively. The center leg of bus 56 is electrically and mechanically connected to the base of the thermostat 45. Screws 59 secure the thermostat to the bus, and also secure the entire assembly to the chassis 21 of the toaster, as may be seen in Fig. 4. The bus is electrically insulated from the chassis by insulating spacers 60 and 61. The thermostat is included in a shunt circuit about heating element 54, which circuit also includes the switch 48, 49 and the release electromagnet 46. Bus bar 62 is used to connect the service connection to one end of heating element 53 and one end of heating element 55, while bus 63 connects the opposite end of heating element 55 and one end of heating element 54 to the service connection.

With the service connection 51 connected to a source of electricity, lowering of the bread carriage will effect closing of switch 52. This will cause current to flow simultaneously through parallel circuit branches, one extending through the series-connected heating elements 53 and 54 and the other extending through the center heating element 55. Upon heating of the bread-sensitive thermostat 45, switch 48, 49 is closed, causing current to flow through the electromagnet 46. The voltage applied to the shunt circuit through the electromagnet is that across heating element 54. This is substantially one-half of the operating voltage, since heating elements 53 and 54 are series connected directly across the line and are substantially equal in resistance. By using a high resistance winding in electromagnet 46, an extremely low current is drawn thereby upon closure of switch 48, 49. This avoids any appreciable arcing at the switch contacts. Upon energization of the electromagnet, the bread carriage is raised, effecting opening of the switch 52 to de-energize the heating elements and also the electromagnet.

The disposition of the T-shaped bus member 56, which is in effect a center tap between the two outer heating elements 53 and 54, with its arms extending across the bottoms of the bread wells, permits it to respond to the general heat of the toaster. Securing of the thermostat to this bus helps the support for the thermostat to sense effectively the toaster ambient temperatures.

Further details of the mounting of the thermostat 45 and the adjustment of contact 49 may be had by referring to my above-mentioned copending application.

The electromagnet

Figure 9:
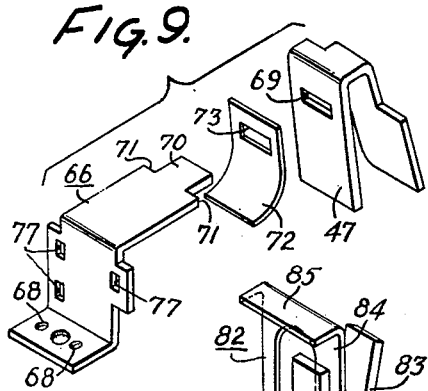
Fig. 9 is an exploded perspective view of some of the parts of the electromagnet.
Figure 7:
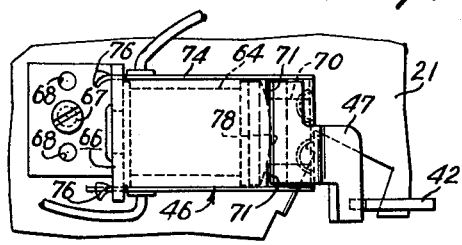
Fig. 7 is a plan view of the carriage-releasing electromagnet.

In Figs. 1 and 3, it will be seen that the electromagnet 46 is mounted on the chassis 21 adjacent one of the end walls of the frame 22 and between the latter and the casing 23. This location has proven by test to be one of the coolest within the toaster and was, therefore, chosen for the location of the electromagnet. Electromagnet 46 (see Figs. 7 to 9) consists essentially of a winding 64, a core 65 riveted to a bracket 66, and the armature 47. The bracket 66 is secured to the chassis 21, as by a bolt 67, and is indexed thereto by projections 68 formed in the bracket and adapted to seat in recesses in the chassis. The armature 47 is of inverted U-shape and is slotted at 69 to receive a tongue-like extension 70 of bracket 66. Captured between the armature 47 and the shoulders 71 of the tongue-like extension 70 is a curved spring element 72 suitably slotted at 73. The mounting of armature 47 on extension 71 provides a pivotal support for the armature. To hold the armature in place, and to prevent crumbs from entering the electromagnet mechanism, a shield or cover 74 is provided which extends along the sides and one end of the electromagnet assembly, being generally U-shaped. Flange 75 on the cover limits the movement of, and also locates, the armature 47. The cover is held on the bracket 66 by tabs 76 which project through apertures 77 in the bracket and are twisted.

Figure 8:
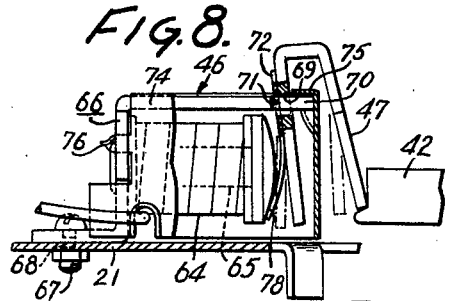
Fig. 8 is a side elevational view of the electromagnet, with the casing broken away and with some parts sectionalized for the purpose of illustration.

The free end of armature 47 engages the free end of latch element 42 when the electromagnet is deenergized. In Fig. 8, the solid line illustration shows the latch-engaging position of the armature. When the electromagnet is energized, the armature is pulled toward the core 65, thereby rotating the armature about the shoulders 71 of the tongue-like extension 70. This causes release of latch element 42 which, as previously mentioned, is then free to swing upward under the force of spring 39.

Spring 72 biases the armature toward the latch-engaging position. This spring is made of non-magnetic spring material, and it also serves to prevent sticking of the armature to the core 65 due to residual magnetism therein. The magnetic circuit can be traced as follows: On energization of electromagnet coil 64, lines of flux are set up through the core 65, through the upper portion of bracket 66, across air gap formed at the pivotal mounting of the armature, through the armature and thence across the air gap to the pole face 78 of the core 65. It should be noted that the pivotal mounting of the armature has low friciton and also provides effective sealing against entrance of crumbs. The coil 64 of the electromagnet is made from wire covered with high temperature insulation, such as nylon.

The thermostat

Figure 4:
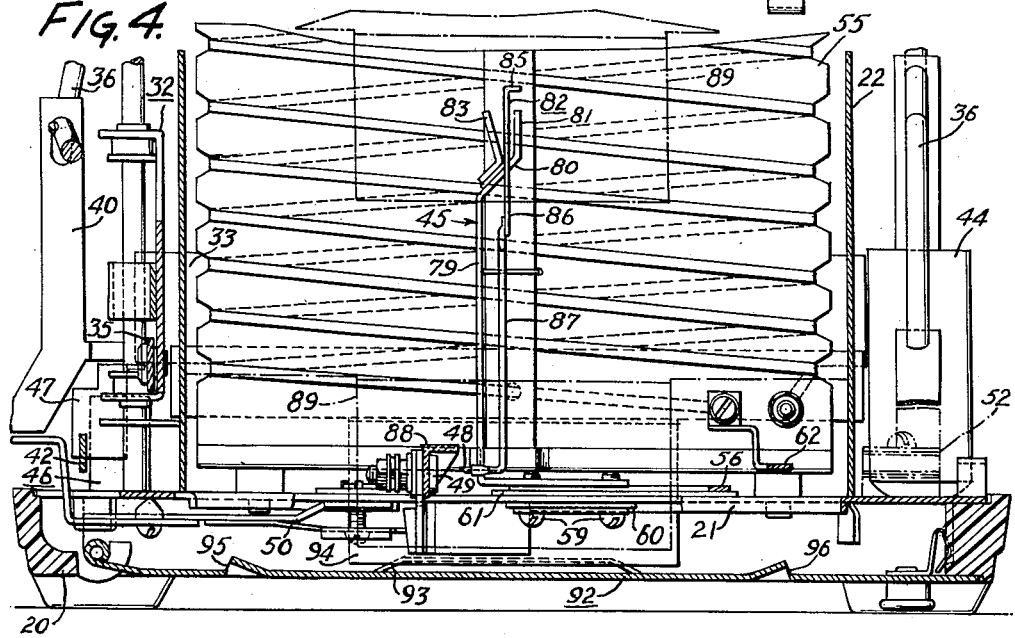
Fig. 4 is a sectional view taken along line 4—4 of Fig. 3, showing the lower portion of the toaster.
Figure 5:
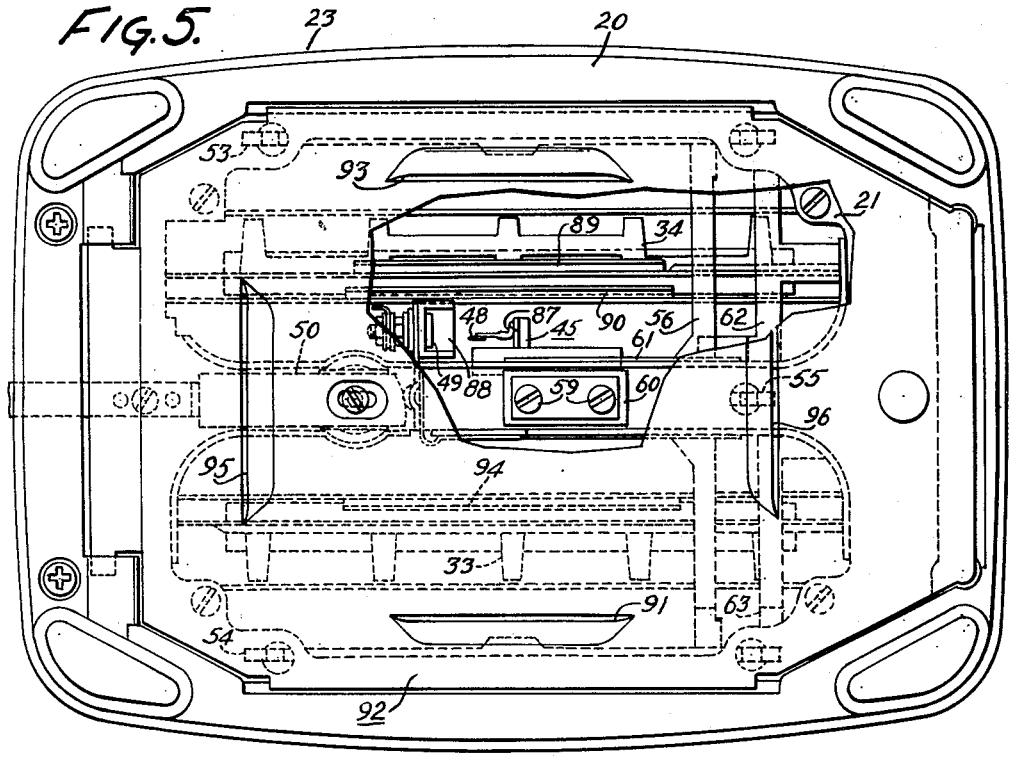
Fig. 5 is a bottom view of the toaster with a portion of the crumb tray broken away for the purpose of illustration.
Figure 6:
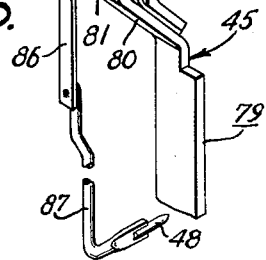
Fig. 6 is a perspective view of the bread-sensitive thermostat.

The bread-sensitive thermostat 45 represents an improvement to that disclosed and claimed in the W. H. Vogelsberg Patent No. 2,667,115, which issued January 26, 1954. In Figs. 2 and 4 the thermostat is shown to comprise a support 79 which is secured to the chassis 21 but is electrically insulated therefrom, as hereinbefore described. As may be seen in Fig. 6, the upper portion of support 79 is inclined at 80 and terminates in a shield 81. Secured at incline 80 are a bimetallic member 82, which is the thermomotive member of the thermostat, and another shield member 83. The latter two members are rigidly fixed to the support 79 as by spot welding. Shields 81 and 83 are disposed on opposite sides of the bimetallic member 82 and are spaced therefrom. The spacings between the bimetallic member and the shields were carefully ascertained for optimum performance of the thermostat. For example, with a bimetal member of .025" thickness, shields 81 and 83 are approximately .040" thick, ⅛" wide, and are spaced at the top respectively ¹⁄₃₂" and ⅛" from the vertical axis of the thermostat.

The bimetal member 82 is generally of inverted U form, and the supporting leg 84 thereof serves as the compensating or secondary leg. The rigid securing of the compensating leg 84 and the support 79, and the close thermal association of said support and the bus 56 assures that the compensating leg shall receive temperature intelligence that in effect is a true measure of the ambient temperature of the toaster. The purposes of the shields 81 and 83 are to provide a thermal lag to the compensating leg of the thermostat and also to minimize the amount of direct radiation that the compensating leg receives from the heating element 55 which is directly back of the thermostat. Previous attempts at shielding the compensating portion have resulted in devices that give inconsistent coupling effect between the shield and the compensator. Loose shielding parts added to the compensator also, through friction, added hysteresis to the movement of the compensating leg. The present shield construction obviates the objections of prior devices. With the compensating leg 84 of the thermostat secured at its bottom to the support 79 and with its high expansion side disposed toward the right in Fig. 4, its upper end will move toward the left on heating, and thus will move closer to shield 83 and farther from shield 81. On cooling, the reverse action will occur. By this arrangement a substantially constant coupling between the shields and the compensating leg is obtained.

The bimetallic member 82 also has a reinforcing flange 85 and a primary leg 86. The primary leg responds to the bread temperature and, similar to the compensating leg, flexes in a plane parallel to the planes of the bread slices and the heating elements to effect movement of contact 48 toward contact 49. As may be seen in Fig. 4, primary leg 86 of the thermostat has secured thereto, as by welding, an L-shaped rod 87 which is effectively an extension of the primary leg and which carries contact 48. The latter is preferably a small piece of circular platinum wire of approximately .015" diameter, which is secured, as by spot welding, to extension 87 and has a sharp sheared tip for optimum contact operation. The tip flexes toward the stationary contact 49 which is made preferably of fine silver. The use of the circuit and electromagnet release as hereinbefore described requires that the contact 48 merely engage contact 49 to cause release of the bread carriage. The arcing load on the contacts, because of the circuit used, is kept quite small. However, to obviate the effect of film build up and to break down surface oxides and other films that may accumulate on the contacts as a result of the toasting operation, the sharp point is provided on contact 48 as described above. A shield 88 additionally protects stationary contact 49 from crumbs falling directly upon said contact.

By reducing the work load on the thermostat, it is possible to reduce the cross-section of the legs of the bimetal and thereby its speed of response. Reduction in mass of the thermostat improves the ability of the thermostat to track the surface temperature of the bread slice 27 that is placed in front of it, as may be seen in Fig. 2, and further increases the speed of cooling of the thermostat at the end of the toasting cycle. To further promote rapid cooling of the thermostat, a rectangular shield or plate 89 is secured to the bottom of bread carriage below bread rack 34 (see Figs. 2 and 4). During the toasting operation, shield 89 is positioned near the base of the toaster. At the end of the toasting cycle when the carriage is in its top position, the shield 89 is located adjacent the primary leg 86 of the thermostat, in the dotted line position in Fig. 2. The primary leg 86 then loses its heat by radiation to the shield 89. The shield also prevents radiant energy from the heating element 53, which would be still warm, from impinging on the primary leg 86 of the thermostat. When the carriage is in its lower position, the shield 89 is adjacent a plate 90 which is mounted on the frame of the toaster and is stationary. During the toasting operation, plate 90 shields plate 89 against radiant energy from heating element 55. Plate 90 also cooperates with a side louvre 91 in the crumb tray 92 to create a draft of cool air from beneath the toaster to plate 89 and maintain the latter at a relatively low temperature. The plate 90 is spaced relatively close to shield 89 when the latter is in its lower position and the two thereby provide a relatively high resistance path for air flow therebetween. Further, plate 90 extends below the shield 89 and is practically adjacent the crumb tray 92. The arrangement of the plate 90, the shield 89 and the louvre 91 prevents the air draft from rising past the thermostat during toasting operation to spuriously affect its performance. On the other hand, it creates a flow of air past the right hand side of shield 89 (Fig. 2) and up the right hand side of the bread slice 27. An additional louvre 93 is provided in the crumb tray and an additional stationary plate 94 is provided, so that balanced parallel drafts of air are produced upward in both bread wells. Additional louvres 95 and 96 (Fig. 4) are provided in the crumb tray to assist in cooling the end plates of the toaster and also in creating drafts to help carry away moisture and other volatile products of the toasting operation. By reducing the mass of the thermostat and by quick cooling action of plate 89, the thermostat is caused to be extremely reliable and quickly responsive. Thus, spurious re-releasing of the carriage on insertion of a fresh bread slice is obviated.

While a preferred embodiment of the invention has been illustrated and described, the invention is not limited thereto, but contemplates such modifications and other embodiments as may occur to those skilled in the art.

I claim:

1. In a bread toaster, a frame, a casing surrounding said frame, a bread carriage supported by said frame for vertical movement, spring means arranged to urge said carriage upwardly, said carriage being manually movable downwardly to toasting position, a latching lever pivoted to the frame near one end and having a latch engaging shoulder near the pivot between the pivot and the remote end of the lever, the free end being biased toward latch engaging position, a laterally movable latch pivotally connected to said carriage for retaining said carriage in toasting position, said latch normally lying in vertical position but having a cam surface positioned to contact the latching lever as the carriage is lowered to move the latch laterally, and a shoulder above the cam surface on the latch positioned to engage the shoulder on the latching lever by a gravity actuated lateral movement after the shoulder on the latch clears the shoulder on the latching lever in the course of downward movement of the latch and toaster carriage such that upon release of the carriage the opposed shoulders on the latch and latching lever will engage and a pull will thereby be exerted by the carriage on the latch which tends to rotate the latching lever about its pivot to a position of latch release, a latch keeper arranged to engage a portion of the free end of the latching lever to restrict it against movement to its latch release position, and means for moving the latch keeper in response to a predetermined signal to release the lever, whereby said latch is released and said latching lever returns to its latch engaging position under the influence of its biasing means.

2. The toaster claimed in claim 1 in which the portion of the latching lever engaged by the latch keeper at its free end has a cam surface over which the latch keeper moves to free the latch and latch keeper as the carriage is manually raised.

3. The toaster of claim 1 in which the latch keeper includes an armature which cooperates with an electromagnet, said armature being movable to disengage the lever upon energization of the electromagnet, a nonmagnetic leaf spring biasing the armature out of magnetically held position so that the lever is retained when the magnet is not energized, and a switch adapted to be closed by a thermostat at the time the carriage is to be released connected in series with the electromagnet and adapted to be connected in series with a power source.

4. A toaster according to claim 3 wherein said armature comprises a U-shaped member including a first leg adapted to engage said latching lever and a second leg adjacent said electromagnet.

References Cited in the file of this patent

UNITED STATES PATENTS

| | | |
|---|---|---|
| 1,022,545 | Gronberg et al. | Apr. 9, 1912 |
| 1,984,063 | Graham | Dec. 11, 1934 |
| 2,099,210 | Ireland | Nov. 16, 1937 |
| 2,106,269 | Brosseau et al. | Jan. 25, 1938 |
| 2,120,289 | McCullough | June 14, 1938 |
| 2,234,764 | Ireland | Mar. 11, 1941 |
| 2,344,842 | Weeks | Mar. 21, 1944 |
| 2,383,673 | Olving | Aug. 28, 1945 |

(Other references on following page)

UNITED STATES PATENTS

| | | |
|---|---|---|
| 2,387,586 | Humphreys | Oct. 23, 1945 |
| 2,390,947 | Koci | Dec. 11, 1945 |
| 2,412,727 | Gomersall et al. | Dec. 17, 1946 |
| 2,415,081 | Barclay | Jan. 14, 1947 |
| 2,426,620 | Koci | Sept. 2, 1947 |
| 2,549,094 | Huck | Apr. 17, 1951 |
| 2,557,512 | Padelford | June 19, 1951 |
| 2,560,386 | Gomersall | July 10, 1951 |
| 2,570,453 | Huck | Oct. 9, 1951 |
| 2,585,455 | Gardner | Feb. 12, 1952 |
| 2,592,826 | Scharf | Apr. 15, 1952 |
| 2,616,358 | Stevenson et al. | Nov. 4, 1952 |
| 2,631,523 | Olving | Mar. 17, 1953 |
| 2,667,115 | Vogelsberg | Jan. 16, 1954 |
| 2,667,828 | Koci | Feb. 2, 1954 |
| 2,674,937 | Walder | Apr. 13, 1954 |
| 2,750,873 | Civacek | June 19, 1956 |
| 2,806,421 | Huck | Sept. 17, 1957 |